Mar. 13, 1923.
H. I. CROMER.
PROCESS OF TREATING OR RETTING AND CURING HEMP, FLAX, PERINI, JUTE, OR OTHER FIBROUS MATERIAL.
FILED AUG. 1, 1921.
1,448,391.
4 SHEETS—SHEET 1.
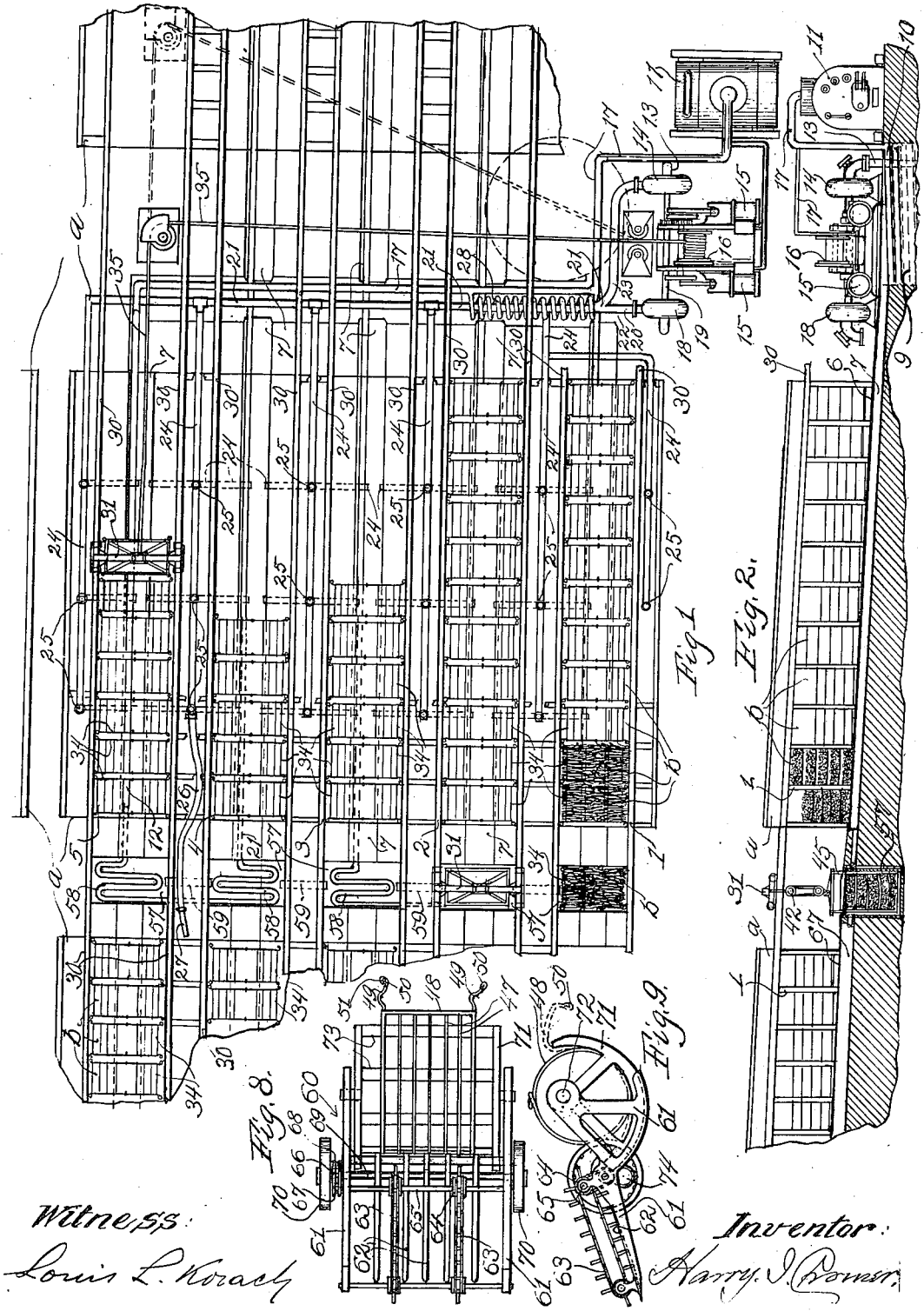

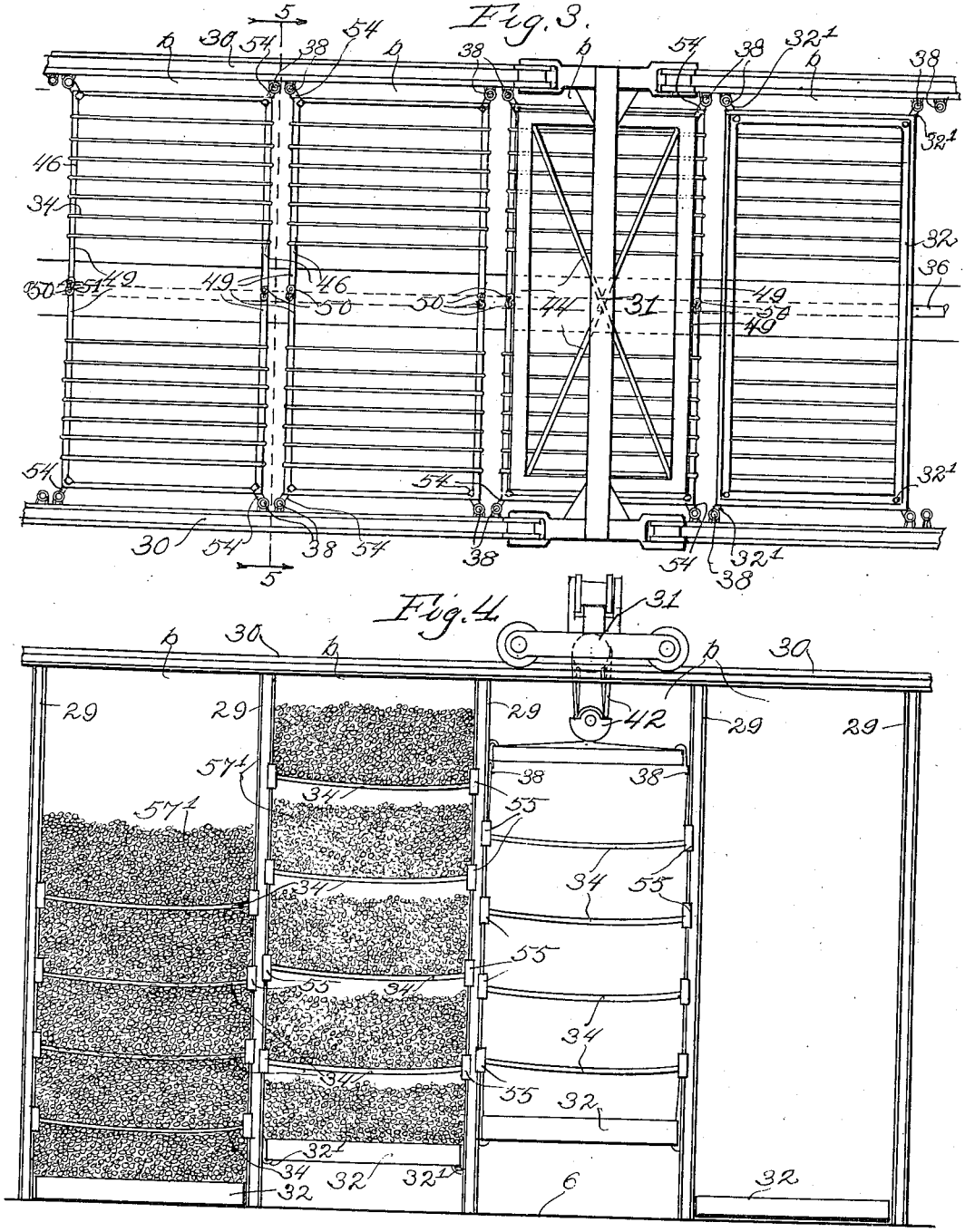

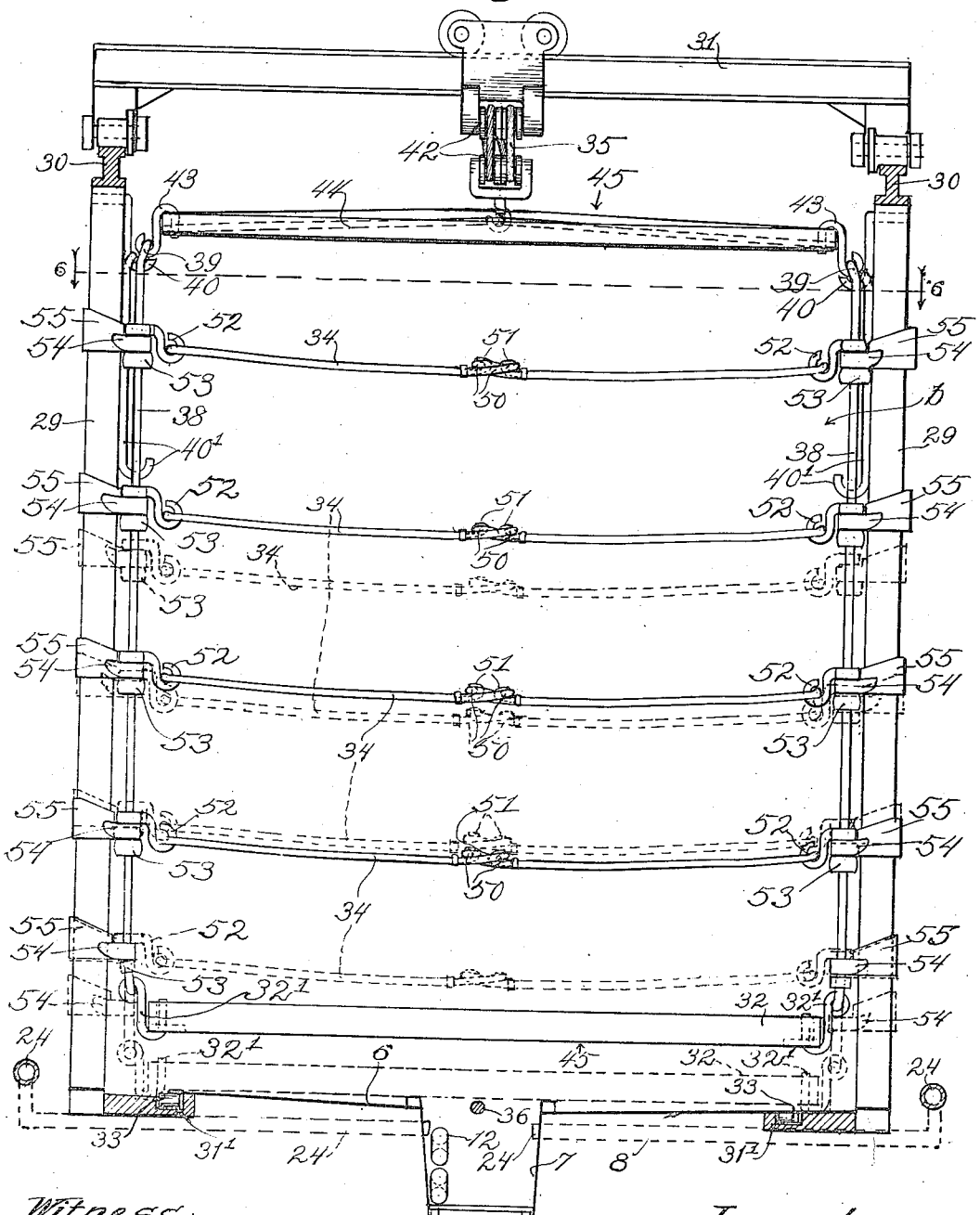

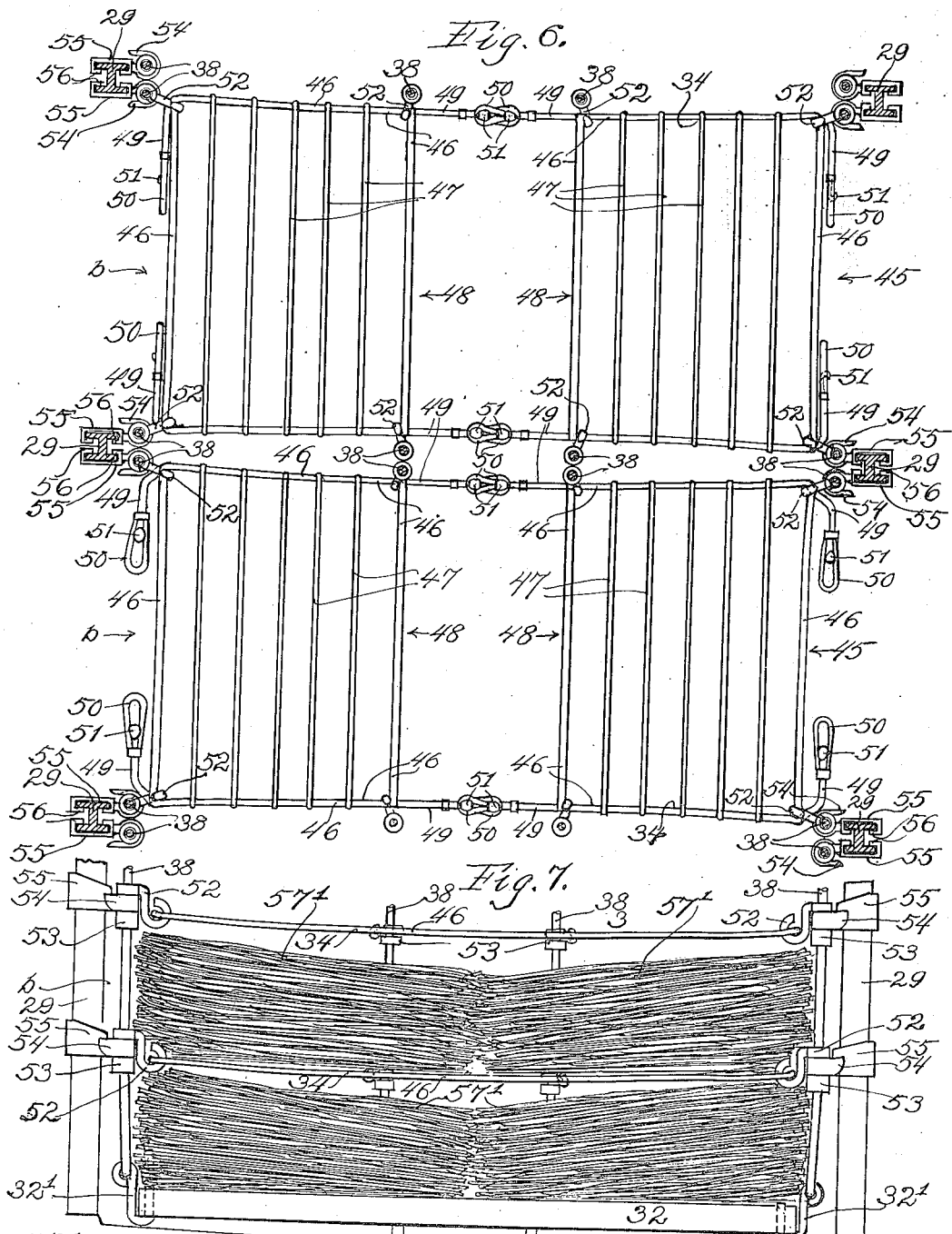

Patented Mar. 13, 1923.

1,448,391

UNITED STATES PATENT OFFICE.

HARRY I. CROMER, OF OAK PARK, ILLINOIS.

PROCESS OF TREATING OR RETTING AND CURING HEMP, FLAX, PERINI, JUTE, OR OTHER FIBROUS MATERIAL.

Application filed August 1, 1921. Serial No. 488,915.

*To all whom it may concern:*

Be it known that I, HARRY I. CROMER, a citizen of the United States, residing at Oak Park, in the county of Cook and State of Illinois, have invented certain new and useful Improvements in Processes of Treating or Retting and Curing Hemp, Flax, Perini, Jute, or Other Fibrous Material, of which the following is a specification.

This invention relates to an improved process or method of retting, or curing and handling stalks of hemp, flax, perini, jute, or other or similar stalks of fibrous material, and particularly to an improved method or means for enabling a good merchantable properly retted hemp, flax or similar fibrous material to be produced, or obtained and made fit for breaking and scutching or other treatment, and in a simple, economical and efficient manner.

The principal object of the invention is to provide an improved, simple, economical and efficient process or method of retting, and efficient process or method of retting, curing and handling or treating hemp, flax, perini, jute or other similar fibrous material, and an improved apparatus for practicing or carrying out such process.

Other and further objects of the invention will appear from the following description and claims, and from an inspection of the accompanying drawings, which are made a part of this specification.

The invention consists in the improved method or process of retting, or retting, curing and handling or treating hemp, flax, perini, jute, or stalks of any of said materials or of other or similar fibrous material, herein described and claimed, and in the apparatus for carrying out or practicing the process, and the combinations of elements herein described and claimed.

In the accompanying drawings, Figure 1 is a diagrammatic plan view of a plant provided with mechanism constructed in accordance with my invention and adapted to be used in practicing my improved process or method of treating, retting, and curing hemp, flax, perini, or other fibrous plant stalks;

Fig. 2 is a view in side elevation of the plant and mechanism shown in Fig. 1; Fig. 3 is a plan view of a plurality of sections of a sectional stack stand and mechanism such as that shown diagrammatically in Fig. 1, with parts broken away or omitted; Fig. 4 is a view in side elevation of the mechanism shown in Fig. 3, showing stalks stacked in closed stack-forming position in separable layers in contact with each other, in one section, and showing the stacked stalks in such separable layers separated, and having air or liquid-containing spaces therebetween in another section, and showing the superposed stalk-supporting frames in raised suspended position on a movable support, in another section; Fig. 5 is an enlarged view in transverse section taken on line 5—5 of Fig. 3, showing the superposed flexible stalk-supporting frames in full lines in extended adjusted position, and showing the superposed frames and their adjustable supports in broken lines in lowered, collapsed closed stack forming position; Fig. 6 is a detail view in horizontal section, taken on line 6—6 of Fig. 5, looking downward, showing adjustable stalk-supporting frames of two stack-stand sections, and the adjustable supporting means for suspending and stretching the superposed frames; Fig. 7, is a view in transverse section similar to Fig. 5, showing separable layers of stalks stacked in downwardly and inwardly inclined self-draining superposed layers, and the supports for the same; Fig. 8 shows one of the separable sections of one of the superposed stalk-supporting frames in position on an invertible dumping receptacle of my improved stalk-gathering, bundle forming machine, in position to receive stalks direct from the swath in the harvest field, and bind the same in bundles, to be loosened and supported by the flexible binding frame suspensible in stack-forming position; and Fig. 9 is a view in side elevation of the mechanism shown in Fig. 8, with a bound bundle in position to be dumped from its pivoted invertible receptacle.

In the art to which this invention relates "water-retting" is impracticable in many localities; and "ground-retting" is objectionable.

To those skilled in the art, it is well known that stalks of fibrous plants such as hemp, flax, or perini, or similar fibrous material, thus treated, are not uniformly retted either throughout the length of the stalks or of the fibers, or throughout the batch of stalks. The upper or more exposed layers, or stalks, or parts of stalks are acted upon by the sun, and winds, and exterior atmospheric conditions in varying degrees and to a different extent and in a different manner from the bottom and interior stalks, parts of stalks and layers, which in some instances are dryer than the upper layers and parts of stalks, and in other instances more damp and retted to a greater extent than the upper or outer layers or parts of stalks, according to the varying conditions of the weather and climate, or uncertain and varying atmospheric conditions. The stalks are thus not equally or uniformly retted throughout the length of the stalks or fiber or throughout the batch of stalks, and are over-retted in parts and thus weakened, or under-retted in parts to the injury of the fibers, although it is obviously very desirable that the fibers should be as nearly as possible uniform in strength and quality throughout the length of the fibers and throughout the batch of fiber or fibrous plant stalks treated, and that the fibers of each batch, respectively, should have so far as possible certain desirable characteristics, such as uniformity in texture, strength, degree of fineness, flexibility, durability, luster, smoothness of texture, color, etc., all of which as well as the quality of being in proper condition to be properly broken and scutched and cleaned, spun, woven or otherwise made into the desired fabric or finished product, are obtainable in a high degree, by treating, retting and curing the fibrous plant stalks in accordance with my improved process and invention.

Boiling and ordinary chemical treatment injures the quality of the fiber.

In treating, or retting and curing hemp, flax, perini, ramie, jute, malva, or other or similar fibrous plant stalks in accordance with my improved process and invention, I provide a quantity of stalks of such hemp, flax or other fibrous material which has been cut or harvested and allowed to lie until the leaves have fallen or have been removed from the stalks, or until the stalks are in proper condition for binding in bundles and shocking or stacking. I also provide one or more stack-stands a, of sufficient dimensions, area, size or capacity to contain, or hold and permit the handling and treatment of the desired quantity of hemp stalks, flax, perini, or other fibrous plant stalks to be treated by and in accordance with my improved process and invention. Each stack-stand section or sectional stack frame 1, 2, 3, 4, 5, has a bottom or base 6, upon or over which the hemp or fibrous stalks to be treated are laid or stacked, such base, floor or bottom 6, having a suitably inclined surface adapted to drain water or liquid received thereby into a suitable drain, trough, or ditch 7, the floor 6 and drain trough or ditch 7 being lined or covered with suitable material such for instance as cement, tile, brick, or waterproof sheet material 8 adapted to shed and carry off water or liquid in such quantities as it is found necessary or desirable to use in practicing my improved process and invention. The drain 7, forms a liquid conduit and leads to and empties into a reservoir, tank or liquid receptacle 9 which is sunk partially or wholly below the surface of the ground, and provided with suitable heating means, such, for instance as a steam pipe or coil 10 connected with a suitable source of steam or heated fluid supply such as a boiler 11, which, in the instance shown in the drawings, is also connected with and adapted to supply steam for heating and circulation in and through the steam pipes or coils 12, for heating the sectional stack-stands, or sections and their contents when desired.

A water or main liquid-supply pipe 13 leads from the tank or reservoir 9 to a pump 14 which is provided with a suitable source of power such as a steam engine 15, which, in this instance is in the form of a well known type of hoisting engine having a hoisting drum or winch 16, and is provided with a steam supply pipe 17 connected with the inlet ports of the engine, which in this instance is a two cylinder engine, and with the steam boiler 11 already described. A rotary blower or pump 18 is also provided and operatively connected with the engine, and also with the water pump 14, which in this instance is a rotary force pump having a driving shaft 19 which is also fixed to the rotor of the air blower or rotary pump 18, said shaft being connected with the engine by suitable gears or in any ordinary suitable manner. A pipe 20 leads from the air pump or blower 18 to the main water supply pipe 21, the receiving end of which is connected with the discharge port of the rotary pump 14; and cocks 22 and 23 are provided which are adapted to enable either the air pump 18 or water or liquid pump 14 to be connected with the water pipe 21, or disconnected therefrom as desired. A series of branch pipes 24, communicate with the main water supply and air supply pipe 21, and are provided with stand pipe or hydrants 25 and connections adapted to be connected with a suitable liquid or water discharging flexible hose or similar device 26 having a nozzle or nozzles 27 for forcing one or more streams or jets of water, air, or other desired liquid or fluid between or amongst the stalks to be retted or treated, and through and into the interior of the stack or stacks, batch or layers of stalks stacked or piled and supported in position to admit the water, air or fluid to the interior of the stack and through and between the layers of stalks to be wet uniformly or saturated, and dehydrated or partially or wholly dried as and when desired and in accordance with my process and invention.

A steam pipe coil 28 encircling the pipe 21 and connected with the steam supply or boiler 11 is adapted to serve as a heating means, for heating the water, air or other liquid or fluid passing through the conduit or main supply pipe 21 and its branches, or any of them and through or between the stalks of fibrous material to be treated, or retted, cured and dried by and in accordance with my improved process and invention.

Parallel rows of upright supports or posts 29 are provided and uniformly spaced apart on opposite sides of each sectional stack, rick or stack-stand section 1, 2, 3, 4, and 5, respectively, and on the top extremities of each row of these posts is mounted a track 30 adapted to support a traveling crane or carriage 31, which may be of any ordinary or suitable form, and is adapted to travel from end to end of any desired pair of tracks 30 and to and from any desired positions intermediate the opposite ends of any and all of th tracks; and a pair of bottom depressed tracks or grooved rails 31¹ are mounted in parallel relation between the bottom extremities of each pair of rows of posts 29 in position to support and carry bottom stalk-supporting frames 32 which are mounted upon rollers or wheels 33 in any suitable manner, said rollers being mounted on the tracks or interposed between the bottom frames 32 and the tracks or equivalent support for the rollers. These bottom frames 32 may be formed of rigid side and end frame members of angle iron or other suitable material, such as wooden or metallic bars, and a flexible sling, frame, net or hammock-like structure 34 is mounted upon and in position to extend across and between the rigid side and end frame portions of the rigid movable frame thus formed, although suitable grate bars either rigid or flexible may be mounted in position to extend across the space between and be supported by the side and end frame members of the bottom movable frames 32, for supporting and carrying stalks of fibrous material to be treated or retted, and handled.

A cable 35 is connected at one end with the drum or winch 16, and is provided at its opposite end with suitable connecting means or gear of any ordinary or desired form for detachably connecting it with either the crane 31 or with any desired bottom carriage frame 32, or with both, as desired. A cable or chain 36, however, is mounted beneath and detachably connected with and is adapted to form a connection between an entire row or series of bottom frames or carriages 32, and with the cable 35 and drum 16, so that any or all of the carriages or bottom frames 32 may be moved, longitudinally of their supporting tracks or to or beyond either end of the sectional-stack stand, each carrying its load of stalks from one stack stand to another or directly to a breaking and scutching machine, which may be of any desired type adapted to separate the fibers from the hurds or shives or woody portions of the stalks in an efficient manner, after the stalks have been retted and prepared for breaking and scutching in accordance with my imparoved process of retting, curing and drying or treating fibrous plant stalks.

Each of the sectional stack-stands or units 1, 2, 3, 4, 5, of which there may be any desired number, contains or forms any desired number of sections $b$ of suitable dimensions for enabling a desired quantity of stalks to be retted and handled or treated therein in accordance with the herein described process. For instance five of such stack-stand units each approximately 200 feet long by 16 feet wide, by about 16 or 18 feet high, forming approximately 25 sections $b$ each about 8 feet by 16 feet and of the same height as the upright frame portion of the stack stand of which they form a part, is suitable for use in connection with my retting process in retting or treating hemp or perini or similar long fibrous plant stalks, while a stack stand and apparatus of smaller dimensions would serve for retting, treating and handling flax, or relatively short stalks of fibrous material of any kind to be treated.

Each stack-stand section $b$ is provided with an angular, preferably flexible suspensible stalk-supporting frame 45, between parallel rows of stationary upright posts 29 and the tracks 30. Each of these sectional suspensible frames 45 is extensible and collapsible, and comprises a set of main normally upright depending suspension cords, rods, or members 38, including four corner suspension members 38, one at each corner of each suspensible or suspended frame 45, or at each corner of each section $b$. There being a bottom angular rigid frame or carriage 32 for and forming a part of each suspensible frame 45, there is a main suspension cord or member 38 for each of the four corners of each bottom frame 32; and the bottom end of each cord 38 is detachably connected with the corresponding corner portion of the frame 32 to be supported and raised and lowered thereby, by means of a hook 32' or similar connecting means adapted to detachably connect such cord with the bottom frame. Each main suspension member or cord 38, is provided with one or any desired number of loops 39 at its upper extremity, and which may be formed in one integral piece with such main suspension member or cord. Each loop 39 is adapted to be detachably hung upon a hook 40, or similar suitable support upon the upper extremity of an upright stationary frame member or post 29 adjacent to the cord 38 to be supported by such hook 40. The hooks 40 and loops 39 are adapted to support the cords 38 in raised or extended position either connected with a stationary support, such as a post 29, or with a traveling crane or other suitable form of movable support 31. And suitable supporting means such as hooks 40', hung from hooks 40 or other stationary support—or equivalent supporting means—serve to support the cords 38, and superposed stalk supporting frames 34, and their contents in collapsed or lowered stack forming position, or in position to allow the separable superposed layers of stalks to rest directly on each other, and on the floor of the stack stand.

A hoisting block and tackle 42 is mounted on the crane 31, and provided with hooks 43. A rigid angular frame 44 hung on the tackle serves to hold the hooks 43 spread apart and in position to detachably engage and support the upper extremity of the corresponding main suspension member or line 38 directly above the corner or marginal portion of the bottom frame 32 to which the bottom end of such line is attached. An angular suspended frame 45 is thus formed for each section $b$, comprising a set of main suspension members or lines 38, each adapted to be detachably connected with a stationary support, and also adapted to be detachably connected with a movable support or carriage, such as the traveling crane already described. And each suspensible frame 45 also comprises an angular bottom frame 32 adapted to rest upon the floor or base when the suspensible frame 45 is lowered, but connected with and adapted to be supported in suspended position by the set of main suspension members or lines 38, the lower ends of which are attached to such bottom movable frame; and also comprises a series of superposed relatively adjustable openwork flexible frames or grates 34, each movable upward and downward with respect to the other members of the set of such superposed frames, and each adapted to be detachably and adjustably connected with and supported by the corresponding set of marginal main suspension members or lines 38.

Each of the superposed, adjustable and removable openwork stalk-supporting frames, grates, or nets 34 is, by preference, constructed of flexible material (such as galvanized wire,) the inner or transverse strands of which may be twisted or woven so as to form a net or reticulated flexible frame portion which is supported by strong flexible outer marginal portions of the same or any suitable flexible material, if desired. These superposed suspensible and relatively adjustable frames or grates, when constructed as shown in the drawings, comprise an angular outer flexible marginal frame or cord which may be formed in two detachably connected sections 46, 46 which form the outer side and end frame portions which support the inner or cross wires or cords 47.

The cross cords or bands 47, which extend across and form the openwork or reticulated flexible main body of each frame 34, may be formed of single strands of wire or cord, or of any suitable material, and may be detachably connected with the marginal cords 46, or may have the wires or cords woven into or around the marginal cords 46, or connected therewith in any desired ordinary or suitable manner. The cords 47 may be separate or woven together so as to form a net or net-like structure, or flexible openwork stalk-supporting frame.

These flexible frames 34 are,—when desired,—each formed in two separable or detachably connected sections 48, 48; (See Fig. 6) and each section 48 of each frame 34 is provided at each corner, with a loose or projecting cord 49, having one or more loops 50, each provided with a hook 51 normally located inside of and in position to be shielded or guarded by such loop from catching onto stalks or other things through which the cords, or said loops or hooks may be hauled or drawn. These hooks are provided with clips or fastening collars or similar suitable fastening means 51', one at the base of each hook and encircling the base of the corresponding loop 50, and cord 49, or with strands of fine wire or cord which may be integral with or form a part of the cord 49, which may be formed of strands of fine wire or cord, or similar flexible material. The hooks are thus each flexibly connected with the cord 49 in such position that any hook may be hooked into engagement with any loop 50, or similar loop, ring or eye either in the same cord 46, or in any other cord, and any loop 50 may be passed through any other adjacent loop 50, or similar securing means, and each or any desired hook 51 may be hooked into engagement with any desired loop 50, or other similar loop, ring, link or support, or other device to which the hook 51 or the member on which it is mounted is to be attached. Each section 48 is thus adapted to bind or form a band for a bundle of hemp or fibrous plant stalks around which it may be fastened with facility in the harvest field, either by means of the loops 50, and hooks 51, or other fastening means.

The frame sections 48, 48 of each frame 34 are thus adapted to be connected together as shown in Fig. 6, or in any desired relation to each other, and interchangeably, and are adapted to be detachably connected with and suspended in superposed relation upon main suspension cords, rods or similar elements 38, in any desired ordinary or suitable manner, or with any other suitable support.

A very simple and efficient connecting means for detachably connecting the frames 34 with the main suspension members 38, and in relatively adjustable separable superposed relation to each other is shown in the drawings: (See Figs. 5, 6, and 7.)

At each corner of each of the superposed stalk-supporting frames 34 is provided a hook or connecting link 52 which is mounted in sliding engagement with and encircles a corresponding main suspension cord, rod or flexible frame member 38. The inner or lower hooked extremity of each hook 52 is hooked into detachable engagement with the corner portion or marginal cord 46 of the frame 34 to be supported. And each cord 38 is provided with a series of stops, knobs or collars 53 fixed thereto, one for each corner of each superposed frame 34, and each in position to support or limit and prevent the downward movement of a corresponding hook 52, and of a corresponding adjustably supported corner of a corresponding frame 34, with respect to the main suspension members or cords 38. Detachably connected with each corner of each of the superposed stalk-supporting frames 34, and in slidable engagement with a corresponding cord 38 is a hook or link 54 which encircles or partially encircles the engaged suspension member 38 and partially encircles the flanged margins of a corresponding stationary upright post 29, and is freely slidable upward and downward on such post. Each hook 54 has a post-engaging body 55 having angular inturned flanges 56 in sliding engagement with and partially encircling opposite side flanges of the post 29, or I-beam, on which such hook is slidably mounted. These hooks thus hold the frames 34 stretched, and permit free upward and downward movement of the cords 38 with the frames 34, hooks 52 and collars 53.

The knobs or stops 53 on the lines 38 are spaced apart the necessary distance from each other so that they will support the superposed flexible relatively adjustable frames 34, 34, 34, 34, 32 of each section at a greater distance from each other when the lines 38 are in raised or extended position, and the frames 34 in raised position, than when said frames 34 are in lowered or collapsed position, in which case the lines 38 are also in collapsed or lowered position, so that the weight of the stalks on each flexible openwork frame 34 will rest directly upon the stalks on or in the frame immediately beneath, throughout the entire set of superposed frames. But the stalks of fibrous material on each of the superposed frames 34 will be raised and supported out of contact with the stalks in the frame next below it whenever the lines 38 are extended or raised at their upper extremities and fastened in position upon either a stationary or movable support and in position to support in suspended position the corresponding superposed flexible stalk-supporting frames 34. Air spaces are thus provided between the superposed sections or layers of stalks in the superposed frames 34, and it is obvious that when the frames 34 and their contents consisting of fibrous plant stalks laid thereon, butts outward, and heads inward, and so that the stalks are inclined downward and inward from their butt ends or outer exposed ends to or toward their inner or head ends and in the direction of the center of the stack, it is quite possible and convenient to introduce or force any desired quantity of water or liquid between the stalks and into contact with all parts thereof, and to saturate all parts of all of the stalks whenever, and for as long a time as may be desired, and to then lower all of the layers or separable sections of stalks and the frames on which they are laid, so that they will be in close contact, and may be kept saturated for as long a time as may be desired, and again raised or separated section by superposed section, and lowered section by superposed section, as desired.

The flexible frames 34 are only made in separable sections or with projecting cords 49, loops 50, and hooks 51, in case they are to be used as a binding means or as bands, for binding bundles of fibrous plant stalks in bundles, and then serving in the stack as superposed stalk-supporting frames; but are made in a more simple inexpensive form and in one integral piece or complete net-like flexible frame or structure, with the marginal cords of each of such frames formed in one integral piece or one cord of any desired number of strands, and with or without corner cords 49 with their loops and hooks, which are adapted to be attached to the main suspension members 38 and in engagement with collars 53, when desired, to support the superposed frames 34 at the desired distance from each other either when suspended or when in lowered closed-stack position. The suspensible frames forming position are adapted to be released from hooks 54 and posts 29 by simply removing the cords 38 from engagement with the hooks 54.

The superposed separable layers of hemp, flax or other fibrous plant stalks 57' should be laid on the superposed frames 34, butts outward and inclined upward, as shown in Fig. 7, and in Fig. 4, but may, of course, be bound in any ordinary manner, with any desired form of bands or binding means, or gathered in any desired manner and laid or stacked in separable layers on the frames 34 in any desired position adapted to enable the stalks to be moistened, or saturated, maintained in contact or closed stack-forming position, and spaced apart in superposed separate layers with air spaces between the layers, in accordance with the herein described process.

They may be lowered in frames 45, into vats or tanks 57, heated by steam coils 58 connected with the boiler 11 by pipes 21 or other connections, said vats containing water or liquid sufficient to submerge the stalks, and being connected by conduits or pipes 59, and by troughs 7, with each other and with the main tank 9; and after thus being submerged and saturated the stalks may be raised by the tackle 42, crane 31 and engine 15, and deposited in any desired section $b$ of the stack stand, and there treated;

Although the stalks may be thus submerged and saturated in tanks, such as tanks 57 containing liquid at a suitable temperature, and containing any desired ingredients to be used in retting, and may then be raised and dried in the suspensible frames 45 in the stack stand or section $b$, the herein described process enables the ordinary stacking of the stalks and sweating in stacks, and removal of the stalks from the stacks, opening of the bundles and spreading of the stalks on the ground to be retted by exposure to uncontrollable conditions of temperature, moisture, and atmospheric or climatic conditions, and the regathering of the unevenly retted stalks, as well as the submerging of the stalks in tanks or liquid. and the subsequent spreading of the same on the ground, and regathering of the "water-retted" stalks after being thus handled, to be dispensed with.

And, although I have described a suitable form of flexible frame 34, adapted to be used as a band for binding stalks in bundles in the harvest field, as well as for supporting the stalks in separable layers in the stack, any desired form of bands may, of course be used for binding the bundles; and stalks may even be handled, and stacked in suspensible frames 45 without being first bound, if desired. In Figs. 8 and 9, however, I have shown a separable section 48 of a flexible frame 34 used for binding in bundles in the harvest field stalks of hemp, flax, or other similar fibrous plant stalks, and have also shown a simple and efficient stalk-gathering bundle forming mechanism 60 having a frame 61 provided with inclined rake teeth 62, toothed feed chains 63, driven by sprocket wheels 64 on a shaft 65 journaled in the frame and driven by a sprocket chain 66, gear 67 fixed to shaft 65 and gear 68 on axle 69, supported on wheels 70, which support the frame 61. A pivoted dumping receptacle or swinging cradle 71 hung on trunnions or pivots 72 mounted in the frame 61 back of the rake teeth and in position to receive stalks fed rearward over the rake teeth into said receptacle 71, has transverse frame members 73, on which is laid one or more bands, which may be in the form of a flexible section 48 of a flexible frame member 34, or any ordinary or desired form of flexible band, formed of one or more strands of wire, twine, or cord; and any suitable means for fastening the band around the bundle, or knotting the band or bands, may be employed. The receptacle is inverted by being turned on its axis formed by pivots 72, to dump the bound bundle on the ground. Any ordinary motor 74 may be used.

In practicing my said process and invention, I stack the stalks of harvested hemp, flax, perini, jute, malva, or other fibrous plant stalks to be retted, cured and dried, or treated in accordance with my said process, upon a suitable support, such, for example, as the floor of a suitably drained stack-stand $a$, or one or any desired number of movable or suspensible stalk-supporting members, such, for instance, as a bottom frame or frames 32, or any desired number of superposed supporting members or frames 34.

The stalks, however, should be, and are stacked or laid side by side in contact with each other so as to form separable tiers, layers or sections, the stalks of the same layer, and those of adjacent superposed or approximately parallel layers or sections having their butt ends pointing outward and exposed and on a plane as high or higher than their opposite relatively small ends, or head ends of the same stalks or other stalks in the same tier or approximately horizontal layer of the same swath or swath-like row or rank of stacked stalks. A very desirable form of stack of stalks to be retted or treated by this process is made by building a plurality or pair of swaths, swath-like rows or ranks of stalks laid together as above described in each swath, swath-like row or rank, with the heads of the stalks of both swath-like rows together or toward each other, and the butts of the stalks of both swaths, swath-like rows or ranks extending toward the outside of the stack and exposed so as to form the outer sides of the stack thus built.

Each stack thus made or built—and there may be any desired number of stacks—consists of or comprises a pair or plurality of swaths, or swath-like rows or ranks of stalks having the butt ends of the stalks of both such swaths or rows extending outward and forming the outer exposed surface or sides of the stack, and the opposite relatively small or head ends of the stalks of both swaths, swath-like rows or ranks of such stalks extending downward and inward at an incline toward the central lower portion of the stack, or toward the opposite side of the same swath-like row or bank of stalks in such position that the stalks tend to permit or cause any water or treating liquid introduced between the butts or relatively higher ends of the stalks to flow inward longitudinally of the stalks, and through the inner portion of the stack or swath-like bank of stalks and drain out after thoroughly and uniformly wetting or saturating all parts of the stalks in any and all desired sections or portions of the stack.

Each stack of stalks thus built, and each swath or swath-like row or bank forming such stack or any section thereof, comprises separable relatively adjustable or upwardly and downwardly movable superposed tiers, layers or approximately horizontal slightly inclined rows of inclined stalks, which have correspondingly adjustable superposed openwork stalk-supporting frames, or suspensible flexible stalk-supporting means interposed between said superposed tiers and built into the sectional stack progressively along with the building of the stack, and forming a part thereof. These superposed tiers, and their supports, are themselves formed in separate or separable sections, corresponding with separable stack sections, and are adapted to be raised to extended separated position, and lowered into contact and into supporting engagement with each other in collapsed closed-stack forming position, successively, alternately, and repeatedly in any desired order, and are so raised and lowered, and supported in either raised or collapsed positions for any desired period of time.

The stalks, after being stacked as above described, or in any suitable manner to keep them dry, are allowed to stand in lowered, collapsed or closed-stack-forming position and there subjected to a process of sweating for a suitable period of time which varies according to temperature; and during the sweating process, they are allowed to become heated to a temperature which should not be higher than 12 degrees above atmospheric temperature, or 120° F.

During the sweating period or operation, the temperature of the stalks is caused or permitted to increase gradually, beginning at atmospheric temperature, and gradually rising to a suitable maximum sweating temperature—for example, to not exceeding 12° or 15° F., above atmospheric temperature, and should in no case be permitted to exceed 120° F. In case the temperature rises to any material extent beyond the temperatures indicated, it is promptly stopped from rising higher, or reduced, by separating the superposed tiers of stalks, admitting air between the stalks and tiers, or introducing relatively cool water into the interior of the mass of stalks, or by all three of these means, as often as may be found necessary to properly limit the heating or maintain the proper temperature. At the temperatures above indicated, as a maximum limit the sweating operation should be continued for a period of from seven days to three weeks, more or less according to the temperature, and may be continued for any desired further length of time, or until it stops, provided the stalks are not exposed to the action of moisture admitted thereto so as to prolong the sweating. The stalks may be allowed to stand in a dry condition for any length of time after the sweating is completed, if desired.

The stalks are then thoroughly saturated uniformly throughout the mass of stalks to be retted, with water or liquid containing water and bacteria, fungi or mold which is readily obtained by submerging hemp, flax or other fibrous plant stalks in water, or by causing water to flow between and through a mass of such stalks, continuously for four or five days at a suitable bacteria breeding temperature—for example 96° F., or thereabout—or repeatedly until a suitable culture containing bacteria, fungi, or mold, such as may be thus obtained from hemp, flax, ramie, clover, or other or similar vegetable material or fibrous plant stalks, has been developed. In this liquid, or water, or any suitable liquid the stalks are thoroughly saturated uniformly throughout the mass.

After moistening, and thoroughly saturating the stalks uniformly throughout the mass of stalks to be retted, either by submerging the stalks in the water or liquid, or by introducing the water or liquid between the stalks in streams or jets and at a suitable temperature, and causing it to flow through the mass of stalks, they are kept in a moist or saturated condition either continuously and without interruption or intermittently, and with the stalks and water or liquid at a temperature which should be between 80° F. and 120° F., or may be as near 96° F. as practicable, but which may vary between 60° and 120° F., without detriment to the fiber, but should in any case be at all times above the freezing point and below a bacteria-sterilizing temperature of say 170° F. The retting is very slow at low temperatures, and a temperature above 120° F., will have a tendency to injure the quality of the fiber product by eliminating or reducing the oil contained in the fiber, and rendering the fiber more brittle, harsh, and less flexible, and rendering it less strong and durable.

Stalks of hemp, flax, perini, ramie, jute, or similar fibrous plant stalks, thus kept saturated in water or liquid maintained at a temperature of 96° F., or at a varying temperature between 80° F., and 120° F., for a period or periods covering in all 12 days, or, to be more exact, maintained at a temperature, for example, of 96° for a period of 14 days, without being allowed to become over-heated, will be thereby thoroughly and properly retted, and ready to be dried and thus rendered fit and in good condition for breaking and scutching. At a temperature of 60° F., the stalks, upon being kept uniformly saturated and without being allowed to reach a temperature of 6° above atmospheric temperature, will be sufficiently retted under favorable conditions in a period of 30 days, or thereabout. In each of the foregoing instances, or examples of proper moistening, saturation, temperature and time consumed in retting, the temperature is not allowed to reach a point materially above atmospheric temperature, or—for example—a temperature of 15° F., above atmospheric temperature as the result of spontaneous generation of heat within the mass of stalks, or heat produced by chemical action or decomposition within the mass of stalks, which would tend to lessen the time consumed in retting, but, unless properly positively controlled and limited would weaken the fibers, and render them less elastic and less durable. At a temperature below 70° the process of retting can be accomplished and completed by keeping the stalks thoroughly moistened or saturated for a period of from 3 to 5 months, more or less according to variations in the temperature and moisture, spontaneous heating, etc. The lower the temperature,—other things being equal,—the longer will be the time required to complete the retting, and vice versa.

During the period of saturation of moistening and retting of the stalks spontaneous generation of heat within the mass of stalks or produced by chemical action or decomposition within the mass of stalks, may be permitted to occur and develop to a limited extent, provided it is properly, positively and accurately controlled so as to not cause any detrimental effect to the fibers; and the time consumed in retting may thus be reduced to less than what it would otherwise require to complete the retting process. The temperature thus permitted to develop, however, should be at all times ascertainable and within the control of the operator, and should in no case be allowed to exceed 15° F., above atmospheric temperature, produced by spontaneous generation of heat within the mass in its saturated or moist condition. Any rise in temperature of the mass in its moistened or saturated condition, is limited and controlled, or reduced, by raising the superposed tiers or separable layer of stalks to extended separated position with respect to each other, thereby admitting air between the stalks and tiers to cool or cool and dry them; or relatively cool water is introduced into the interior of the mass of stalks, either in their raised separated position, or as they are lowered, or allowed to lie collapsed.

The stalks having been subjected to the action of water or a bacteria-containing liquid, and kept at the desired constant or varying temperatures for the required period of periods of time to properly ret or partially decompose, the hurds, shives or inner woody substance of the stalks, the stalks may be washed and the products of decomposition removed therefrom, by pouring a current of water between, through and over the stalks, after first raising the superposed tiers of stalks to raised extended or separated position, and supporting them in such raised position with air spaces therebetween. The mold, fungi, bacteria, and products resulting from the dissolving, retting operation are thus returned to the supply tank to be used over again as often as may be desired, sufficient water being added to the supply whenever needed. The washing may be dispensed with if desired in order to save time, or for any reason.

In any event, as soon as the retting or rotting with the stalks in moist or saturated condition has proceeded to its completion or to the stage where further rotting should be prevented, this is accomplished by promptly and thoroughly drying the stalks.

To dry the stalks quickly, thoroughly and uniformly, and at the proper time, the superposed tiers or layers are raised to extended separate position out of contact with each other, thus providing air spaces between the layers and between the stalks, and air in a properly heated and dry condition is forced in copious quantities, in swiftly moving currents between through and throughout all parts of the stalks until they are thoroughly dry. Or, in case time will permit, they may be allowed to stand in separated raised or extended position until dry.

The stalks to be retted are saturated in the first instance—and repeatedly during the period of retting in which they are kept constantly moist,—by either continuous, or repeated intermittent or successive applications of water or treating liquid, applied thereto while the separable superposed tiers or layers of stalks, and their adjustable supports are in raised, extended, or separated position, the separable superposed tiers of stalks being then lowered to collapsed closed-stack forming position; or the superposed separable tiers or layers of stalk may be saturated simultaneously throughout the entire stack, or any desired section or sections thereof, by submerging any or all of the stack sections $b$ in water or liquid for retting the stalks; or each or any of the superposed separable layers or tiers of stalks are stacked or laid in lowered or closed stack-forming position while dry, and then saturated by pouring a stream or jets of water thereon and therethrough, and then laying on the saturated or wet tier another superposed separable tier or layer of dry or wet stalks, and, if dry, wetting it, and continuing thus or saturating each superposed tier either just before, at the time of or immediately after laying or stacking it in closed stack forming position, and continuing to lower or stack and saturate or moisten superposed tier after superposed tier successively in any desired order until the stack is complete and moistened or saturated uniformly throughout. The stalks are thus completely saturated and partially dehydrated alternately, and are subjected to alternate periods of saturation and gradual dehydration or partial evaporation of the treating liquid, until the retting is accomplished.

From the foregoing, it is evident that although the aerating and drying as well as the moistening of the stalks is facilitated by raising and separating the superposed layers and introducing air into the stack and between the stalks while the superposed layers are in raised separated position, and the moistening of the stalks in the stack may also be accomplished with facility while the layers are raised and separated, it is possible under some conditions, when the stack is not too high, to stack the stalks in superposed layers which extend downward and inward at an incline from an outer surface or surfaces of the stack, but either with or without having the superposed stalk-supporting frames between the layers, and to allow the stalks to stand in the stack in close relation, for a period of time so as to cure, thus being subjected to or caused to pass through a curing treatment or sweating action in the stack, then subjecting the stacked stalks to the further action of moisture in the stack either intermittently or continuously for a determined period of time and in a non-submerged condition until properly retted in the stack, and then aerating and drying the stalks, by preference in the stack, by introducing air into the stack and between the stalks either while the superposed layers of stalks are in close relation to each other or while they are separated, or as desired. In any case, however, the curing and retting are by preference, both done in the stack; and the aerating is also, by preference, done in the stack rather than otherwise.

I claim:

1. A process of retting fibrous plant stalks, which consists in stacking the stalks in superposed layers extending downward and inward at an incline from an outer surface of the stack, then allowing the stacked stalks to stand for a period of time in closed relation to each other to cure the same in said stack, then subjecting said stalks to the action of moisture in said stack and keeping the same in a moistened non-submerged condition for a determined length of time and at a suitable temperature to cause retting of the stalks in the stack, and then aerating the retted stalks.

2. A process of retting fibrous plant stalks, which consist in stacking the stalks in superposed layers extending downward and inward at an incline from an outer surface of the stack, subjecting the stalks to the action of moisture in the stack and maintaining the stacked stalks in a moist non-submerged condition in close relation to each other in said stack for a determined period of time and at a suitable temperature to cause a gradual retting of the stalks in the stack, and then aerating the retted stalks.

3. A process of retting fibrous plant stalks, which consists in stacking the stalks side by side in separable superposed tiers or layers forming a stack, moistening the stacked stalks throughout their length and maintaining the stalks in a moist condition in separable superposed tiers in close contact with each other in the stack for a period of time thus causing a gradual retting of the inner woody substance and gum of the stalks, and controlling and stopping the decomposition by separating and supporting the superposed tiers of moist stalks in separated superposed relation out of contact with each other and with air spaces therebetween, and introducing a fluid between the superposed tiers and stalks and dehydrating the stalks.

4. A process of retting fibrous plant stalks, which consists in stacking the stalks side by side in separable sectional superposed tiers forming a sectional stack, moistening the stacked stalks in any desired stack section and maintaining same in a moist condition in separable superposed tiers in contact and supporting engagement with each other in such stack section for a period of time thus causing a gradual retting of the woody substance and gum of the stacked stalks, and controlling and stopping the decomposition by separating and supporting the superposed tiers of stalks of such stack section in separated superposed relation out of contact with each other and with air spaces therebetween, and introducing air between the superposed tiers and between the stalks and drying the stalks.

5. A process of retting fibrous plant stalks, which consists in stacking the stalks in inclined position side by side in separable self-draining superposed tiers, moistening the stacked stalks throughout their length and maintaining them in a moist condition in such separable superposed tiers in close contact with each other in the stack for a period of time thus causing a gradual retting of the inner body substance of the stalks, and controlling and stopping the decomposition by separating and supporting the superposed tiers of moist stalks in separated superposed self-draining position out of contact with each other and with air spaces between the separated tiers, and introducing fluid between the superposed tiers and between the stalks, and dehydrating the stalks.

6. A process of retting fibrous plant stalks, which consists in stacking the stalks side by side in self-draining superposed tiers forming a stack, moistening the stacked stalks throughout their length and maintaining the stalks in a uniformly moistened condition in separable superposed tiers in contact with each other in the stack for a period of time and at a temperature acting to cause a gradual retting of the inner woody substance and gum of the stalks and permitting the stalks to drain off all superfluous liquid during such gradual rotting, and controlling and stopping the rotting by separating and supporting the superposed tiers of stalks in separated superposed self-draining position out of contact with each other, and introducing air into the spaces between the separated superposed tiers and dehydrating the stalks therein.

7. A process of retting fibrous plant stalks, which consists in stacking the stalks side by side in separable superposed tiers or layers forming a stack, moistening the stacked stalks throughout their length in the stack, and maintaining the stalks in a moist condition in such separable superposed tiers for successive periods of time by intermittently introducing liquid between the separable superposed tiers of stalks at a temperature below bacteria-sterilizing temperature and not exceeding 120° F., causing a gradual retting of the inner woody substance of the stalks and a loosening of the gum from the fibers, and controlling and stopping the decomposition by separating and supporting the superposed tiers of stalks in separated superposed relation out of contact with each other and introducing air into the spaces between the superposed tiers and thus drying the stalks.

8. A process of retting hemp, flax or other fibrous plant stalks, which consists in stacking the stalks side by side in separable superposed self-draining tiers forming a stack, saturating the stacked stalks throughout their length in the stack and maintaining them in a moist condition for successive periods of varying degrees of saturation by successive applications of liquid containing water at a bacteria-breeding temperature and below bacteria-sterilizing temperature not exceeding 120° F., and air alternately, acting to cause a gradual retting of the inner woody substance and loosening of the gum of the stalks, and controlling and stopping the decomposition by separating and supporting the superposed tiers in separated superposed self-draining position out of contact with each other in the stack and admitting air into the spaces between such superposed separated tiers and drying the stalks in said tiers and stack.

9. A process of treating hemp, flax or other fibrous plant stalks, which consists in stacking the stalks side by side in inclined position in separable superposed self-draining tiers with butt ends outward and the opposite inner ends of the stalks inclined downward and acting to cause liquid introduced between the butt ends to flow inward lengthwise of the inclined stalks and moisten the stalks throughout their length in the stack, subjecting the stacked stalks to a sweating action in such stack in close contact with each other, then saturating the stacked stalks throughout their length in the stack and maintaining them in a moist condition in such separable superposed tiers in contact with each other in the stack for a predetermined period of time and at a temperature not exceeding 120° F., thus causing a gradual retting of the woody substance and dissolving of the gum from the fibers, and controlling and stopping the decomposition by separating and supporting the superposed tiers of stalks in separated self-draining position out of contact with each other, and introducing air between the separated superposed tiers and between the stalks, and drying the stalks.

10. A process of retting hemp, flax, perini, jute, ramie, or similar fibrous plant stalks, which consists in stacking the stalks side by side in superposed separable tiers or layers and subjecting them to a sweating process in close contact with each other in the stack at a temperature above atmospheric temperature not exceeding 15° F., then saturating the stalks by introducing a treating liquid containing water between the superposed tiers and throughout the mass of stalks and maintaining a moist condition of the stalks for a period of time and at a varying temperature not exceeding 120° F., causing a gradual retting of the inner woody substance of the stalks, and controlling the temperature of the mass of stalks and controlling and stopping the decomposition of the same by separating the superposed tiers or layers of moist stalks and supporting the same in position to provide air spaces therebetween and introducing dry air between the superposed separable tiers and stalks and dehydrating the same.

11. A process of retting hemp, flax, perini, jute, ramie, or similar fibrous plant stalks which comprises stacking stalks side by side in separable superposed tiers in a mass, saturating the stacked stalks uniformly throughout the mass and maintaining a moist condition of the stalks for a period of time and at a retting bacteria-breeding temperature and below bacteria-sterilizing temperature—for example at a temperature of 96° F., and not exceeding 120° F.,—by the introduction of liquid containing water and bacteria such as is obtainable by saturating hemp, flax, or similar fibrous plant stalks in water during a period of decomposition at a bacteria-breeding temperature and below bacteria-sterilizing temperature—for example, at a temperature of 96° F., and not exceeding 120° F., or a varying temperature between 50° F., and 120° F.,—thereby causing a gradual retting of the inner woody substance of the stalks uniformly throughout the mass, and stopping and controlling the decomposition by introducing air between the superposed layers or tiers of stalks and dehydrating the stalks.

12. In a mechanism of the class described, a stalk-supporting frame comprising superposed relatively adjustable stalk-supporting frame members adapted to engage separable superposed layers of stalks normally in closed stack forming position, and provided with means for supporting said superposed adjustable stalk-supporting frame members in spaced apart relation in position to provide a space between adjacent separable superposed layers of stalks to be supported by said adjustable frame members.

13. In a mechanism of the class described, a stalk-supporting frame comprising superposed upwardly and downwardly adjustable stalk-supporting frame members adapted to extend across and in engagement with separable superposed layers of stalks normally in contact with each other in stack-forming position, and supporting means operatively connected with and adapted to support said superposed adjustable frame members in spaced apart relation in position to provide a space between adjacent separable superposed layers of stalks to be supported by said adjustable frame members.

14. In a mechanism of the class described, a stalk-supporting frame comprising a plurality of flexible superposed upwardly and downwardly adjustable stalk-supporting frames adapted to extend between separable superposed layers of stalks normally in contact with each other in stack-forming position, and supporting means operatively connected with and adapted to support said superposed flexible frames in spaced apart relation in position to provide spaces between such separable superposed layers of stalks to be supported by said flexible frames.

15. In a mechanism of the class described, the combination of a series of superposed relatively adjustable stalk-supporting frames adapted to extend across and in engagement with separable superposed layers of stalks and acting to permit such separable layers of stalks to lie normally in contact with each other in stack-forming position, and supporting frame members operatively connected with and acting to support said superposed adjustable frames in position to provide spaces between such separable superposed layers of stalks to be supported by said superposed frames.

16. In a mechanism of the class described, the combination of a depending frame provided with suspension members adapted to be connected with a suitable support, and having a plurality of superposed relatively adjustable stalk-supporting frames adapted to extend across and in engagement with separable superposed layers of stalks normally in supporting engagement with each other in stack-forming position, and connecting means operatively connecting each of said superposed stalk-supporting frames with said suspension members of the depending frame and adapted to permit the movement of the superposed stalk-supporting frames to extend spaced apart position to provide spaces between such separable superposed layers of stalks supported by said adjustable frames.

17. In a mechanism of the class described, the combination of a flexible depending frame comprising flexible suspension members adapted to be detachably connected with a suitable support, and having a plurality of relatively adjustable superposed stalk-supporting frames adapted to engage separable superposed layers of stalks in stack-forming position, and means for detachably connecting each of said superposed stalk-supporting frames in adjustable relation to said flexible suspension members and in adjustable relation to each other.

18. In a mechanism of the class described, the combination of a depending frame comprising marginal suspension members adapted to be connected with a suitable support, a plurality of flexible superposed stalk-supporting frames adapted to extend between separable superposed layers of stalks in stack-forming position, and means for detachably connecting each of said superposed stalk-supporting frames with said suspension members and in adjustable relation to each other.

19. In a mechanism of the class described, the combination of a depending frame comprising suspension members adapted to be suspended from a suitable support, a plurality of superposed stalk-supporting frames of open-work construction located between said suspension members and adapted to extend between separable superposed layers of stalks stacked between said suspension members, and means for operatively connecting each of said superposed stalk-supporting frames with said suspension members in adjustable relation to each other.

20. In a mechanism of the class described, the combination of a set of suspension members adapted to be connected with a suitable support, a plurality of superposed stalk-supporting frames formed of flexible open-work material located between said suspension members and adapted to extend between separable superposed layers of stalks stacked between said suspension members, and means for detachably connecting each of said suspension members with a plurality of said superposed flexible stalk-supporting frames, said connecting means being adapted to permit the movement of the superposed stalk-supporting frames with respect to the suspension members and with respect to each other to different adjusted positions.

21. In a mechanism of the class described, the combination of a set of suspension members adapted to be connected with a support, a plurality of superposed stalk-supporting frames each comprising detachably connected sections of flexible material forming an open-work flexible frame, and means for detachably connecting each of said superposed flexible frames with said suspension members.

22. In a mechanism of the class described, the combination of a stationary main frame, a set of suspension members adapted to be connected with said main frame, a plurality of superposed stalk-supporting frames located between said suspension members and adapted to engage separable superposed layers of stalks in stack-forming position between said suspension members, and adjustable connecting means connected with each of said superposed stalk-supporting frames and with said suspension members and in movable relation to said stationary main frame, and adapted to permit the superposed frames to be moved to different adjusted positions with respect to each other and with respect to the stationary main frame.

23. In a mechanism of the class described, the combination of a stationary main frame having rigid upright frame members spaced apart, a set of suspension members adapted to be connected with the rigid main frame, a series of superposed stalk-supporting frames mounted upon said suspension members and movable longitudinally of the suspension members to different adjusted positions, and connecting means operatively connected with the superposed stalk-supporting frames and with the upright stationary main frame members and movable longitudinally of the latter to different adjusted positions.

24. In a mechanism of the class described, the combination of a stationary main frame comprising a plurality of sections each having upright stationary frame members, a set of suspension members for each section, means for connecting the suspension members with the stationary main frame, a set of superposed relative adjustable stalk-supporting frames connected with each set of said suspension members and adapted to be supported by the latter in position to support separable superposed layers of stalks in position to be treated, and means for operatively connecting the superposed stalk-supporting frames with the stationary main frame.

25. In a mechanism of the class described, the combination of a stationary main frame, a depending frame comprising a set of main suspension members, means for detachably connecting each of said suspension members with the main frame, a plurality of superposed stalk-supporting frames adapted to extend between separable superposed layers of stalks to be supported, and means for detachably connecting each of said superposed stalk-supporting frames with said main suspension members and in upwardly and downwardly adjustable relation to each other.

26. In a mechanism of the class described, the combination of a stationary main frame, a depending frame comprising a plurality of main suspension members, means for detachably connecting the main suspension members with the main frame, a plurality of superposed stalk-supporting frame members located between said main suspension members and adapted to engage separable superposed layers of stalks to be supported thereby, means for connecting each of said superposed stalk-supporting frame members with the main suspension members, and means for raising and lowering the depending frame.

27. In a mechanism of the class described, the combination of a stationary main frame, a depending frame comprising a set of main suspension members, means for detachably connecting the main suspension members with the stationary main frame, a plurality of superposed stalk-supporting frames located between said main suspension members and adapted to engage separable superposed layers of stalks to be supported in separable relation, means for connecting each of said superposed stalk-supporting frames with said main suspension members and in upwardly and downwardly adjustable relation to each other, and means for raising and lowering said main suspension members and said superposed relatively adjustable superposed stalk-supporting frames.

28. In a mechanism of the class described, the combination of a stationary main frame comprising a plurality of sections provided with stationary upright frame members, a suspensible depending frame for each section, each of said depending frames comprising a set of suspension members, and having a plurality of superposed suspensible stalk-supporting frames connected with and adapted to be supported by said suspension members and in upwardly and downwardly adjustable relation, means for detachably connecting said suspension members with the main frame, and means for raising and lowering such suspensible depending frame.

29. In a mechanism of the class described, the combination of a stationary main frame comprising a plurality of sections provided with a plurality of rows of stationary upright frame members, a suspensible depending frame for each section, each of said depending frames comprising a set of main suspension members, and having a plurality of superposed suspensible stalk-supporting frames connected with and adapted to be supported by said main suspension members and in upwardly and downwardly adjustable relation to each other, means for detachably connecting the main suspension members with the main frame, and means for moving the suspensible frames independently of each other in the stationary main frames.

30. In a mechanism of the class described, the combination of a stationary main frame comprising a plurality of sections, a suspensible depending frame for each section, each of said depending frames comprising a set of main suspension members adapted to be detachably connected with the stationary main frame, and a plurality of superposed stalk-supporting frames connected with and adapted to be supported by such main suspension members and in upwardly and downwardly adjustable relation to each other, and means for raising and lowering the suspensible depending frames independently of each other in any desired order.

31. In a mechanism of the class described, the combination of a stationary main frame, a series of suspensible depending frames each comprising a set of depending main suspension members adapted to be detachably connected with the stationary main frame, each of said suspensible frames having a plurality of superposed suspensible stalk-supporting frames operatively connected with such main suspension members in adjustable relation to each other and adapted to extend between and engage separable superposed stalks of fibrous material to be treated, means for raising and lowering the suspensible depending frames independently of each other, and means for introducing liquid between the superposed stalk-supporting frames and in contact with the contents of the suspensible depending frames in any desired order.

32. In a mechanism of the class described, the combination of a stationary main frame, a series of suspensible depending frames each comprising a set of main depending suspension members, and having a plurality of superposed open-work stalk-supporting frames operatively connected with such main suspension members in adjustable relation to each other and adapted to extend between and engage separable superposed layers of fibrous plant stalks to be treated, means for detachably connecting the suspensible frames with the stationary main frame, means for raising and lowering the suspensible depending frames independently of each other, means for introducing liquid between the superposed stalk-supporting frames and in contact with the contents thereof, means for permitting the escape of liquid to be drained from the suspensible depending frames, and means for heating and regulating the temperature of the suspensible depending frames and the contents of the same.

33. In a mechanism of the class described, the combination of a stationary main frame, a series of suspensible depending frames each comprising a set of main depending suspension members, and having a plurality of superposed stalk-supporting suspensible frame members operatively connected with such main suspension members in adjustable relation to each other and adapted to extend across and engage separable superposed layers of fibrous plant stalks to be treated, means for detachably connecting the suspensible frames with the main frame independently of each other, means for raising and lowering the suspensible depending frames independently of each other in any desired order, means for introducing liquid between the superposed stalk-supporting frame members of the suspensible depending frames and between and throughout the layers of stalks contained in the suspensible frames, means for heating and regulating the temperature of the contents of the suspensible frames, and means for moving the suspensible frames and their contents to and from any desired position in the stationary main frame.

Signed at Chicago, in the county of Cook and State of Illinois this 27th day of July, 1921.

HARRY I. CROMER.

Witnesses:
CLARENCE T. CHAMBERLAIN,
M. HARDING.